US012238771B2

(12) United States Patent
Koorapaty et al.

(10) Patent No.: US 12,238,771 B2
(45) Date of Patent: Feb. 25, 2025

(54) FLEXIBLE ENERGY DETECTION IN UNLICENSED SPECTRUM

(71) Applicant: Telefonaktiebolaget LM Ericsson (publ), Stockholm (SE)

(72) Inventors: Havish Koorapaty, Saratoga, CA (US); Sorour Falahati, Stockholm (SE); Iana Siomina, Täby (SE); Narendar Madhavan, Bara (SE); David Sugirtharaj, Lund (SE); Reem Karaki, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 302 days.

(21) Appl. No.: 17/639,784

(22) PCT Filed: Aug. 26, 2020

(86) PCT No.: PCT/EP2020/073903
§ 371 (c)(1),
(2) Date: Mar. 2, 2022

(87) PCT Pub. No.: WO2021/037940
PCT Pub. Date: Mar. 4, 2021

(65) Prior Publication Data
US 2022/0361243 A1 Nov. 10, 2022

Related U.S. Application Data

(60) Provisional application No. 62/891,570, filed on Aug. 26, 2019, provisional application No. 62/993,403, filed on Mar. 23, 2020.

(51) Int. Cl.
*H04W 4/00* (2018.01)
*H04L 1/1812* (2023.01)
(Continued)

(52) U.S. Cl.
CPC ....... *H04W 74/0816* (2013.01); *H04L 1/1812* (2013.01); *H04W 24/10* (2013.01)

(58) Field of Classification Search
CPC . H04W 74/0816; H04W 24/10; H04W 52/36; H04W 52/38; H04L 1/182; H04L 5/0053
See application file for complete search history.

(56) References Cited

U.S. PATENT DOCUMENTS

2018/0027452 A1  1/2018  Tanaka
2018/0176955 A1*  6/2018  Salem ............... H04W 74/0808
(Continued)

FOREIGN PATENT DOCUMENTS

EP          3383085 A1    3/2018
WO      2017030486 A1    2/2017

OTHER PUBLICATIONS

International Search Report and Written Opinion dated Oct. 19, 2020 for International Application No. PCT/EP2020/073903 filed Aug. 26, 2020, consisting of 13 pages.
(Continued)

*Primary Examiner* — Abdelnabi O Musa
(74) *Attorney, Agent, or Firm* — Sage Patent Group

(57) ABSTRACT

Methods and apparatuses are disclosed for energy detection in unlicensed spectrum. In one embodiment, a method implemented in a radio node includes determining a maximum channel occupancy time (MCOT) value; and listen-before-talk (LBT) parameter settings, the MCOT value and/or the LBT parameter settings for one or more LBT parameters depending on an energy detection (ED) threshold value used to access a channel in an unlicensed spectrum; and performing a LBT procedure to gain access to the channel and a transmission on the channel according to the LBT parameter settings and the MCOT value. In one embodiment, a method in a network node includes configuring a wireless device with a MCOT value and LBT
(Continued)

parameter settings, the MCOT value and/or LBT parameter settings depending on an ED threshold value used at the wireless device to access the channel.

20 Claims, 7 Drawing Sheets

(51) Int. Cl.
*H04W 24/10* (2009.01)
*H04W 74/0816* (2024.01)

(56) References Cited

U.S. PATENT DOCUMENTS

| | | | | |
|---|---|---|---|---|
| 2019/0297644 A1* | 9/2019 | Babaei | | H04L 5/0053 |
| 2019/0342915 A1* | 11/2019 | Kim | | H04W 72/20 |
| 2021/0120585 A1* | 4/2021 | Yang | | H04W 76/27 |
| 2021/0243800 A1* | 8/2021 | Xue | | H04W 16/14 |
| 2021/0298074 A1* | 9/2021 | Park | | H04B 17/336 |
| 2021/0307065 A1* | 9/2021 | Xue | | H04W 52/16 |

OTHER PUBLICATIONS

Hiertz et al. Analysis of IEEE 802.11E for Qos Support in Wireless LANs; The Evolution of Wireless LANs and PANS; pp. 40-50; IEEE Wireless Communications; Dec. 2002, consisting of 11 pages.
3GPP TSG RAN WG1 Meeting #84 R1-160561; Title: Discussion on UL power control for UL LAA; Agenda item: 7.3.1.1; Source: Samsung; Document for: Discussion; Location and Date: St Julian's Malta, Feb. 15-19, 2016, consisting of 3 pages.
ETSI EN 301 893 V2.1.1; 5 GHz RLAN; Harmonised Standard covering the essential requirements of article 3.2 of Directive 2014/53/EU; May 2017, consisting of 122 pages.
3GPP TSG-RAN WG2 meeting #90 R2-152327; Title: LBT Impacts On High Layers for LAA; Source: ZTE; Agenda Item: 7.1.3; Document for: Discussion and Decision; Location and Date: Fukuoka, Japan May 25-29, 2015, consisting of 3 pages.

* cited by examiner

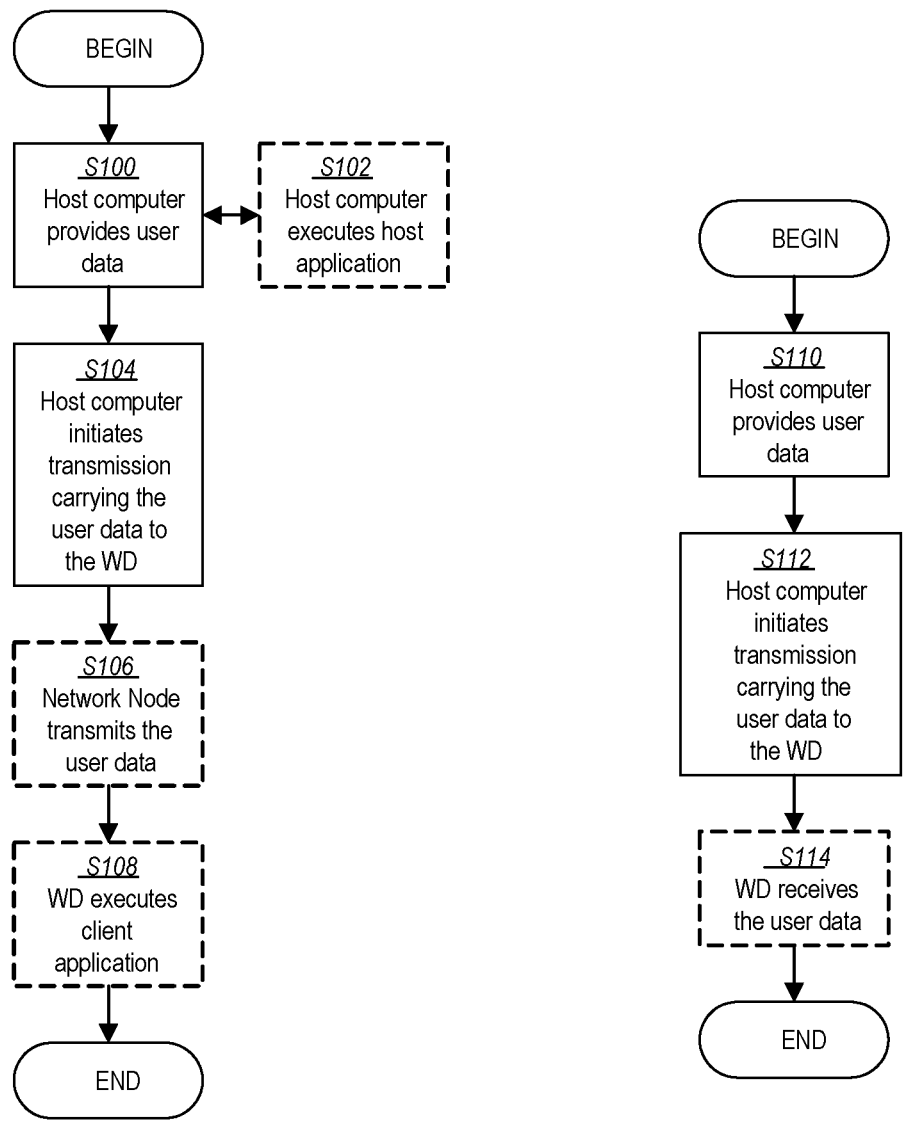

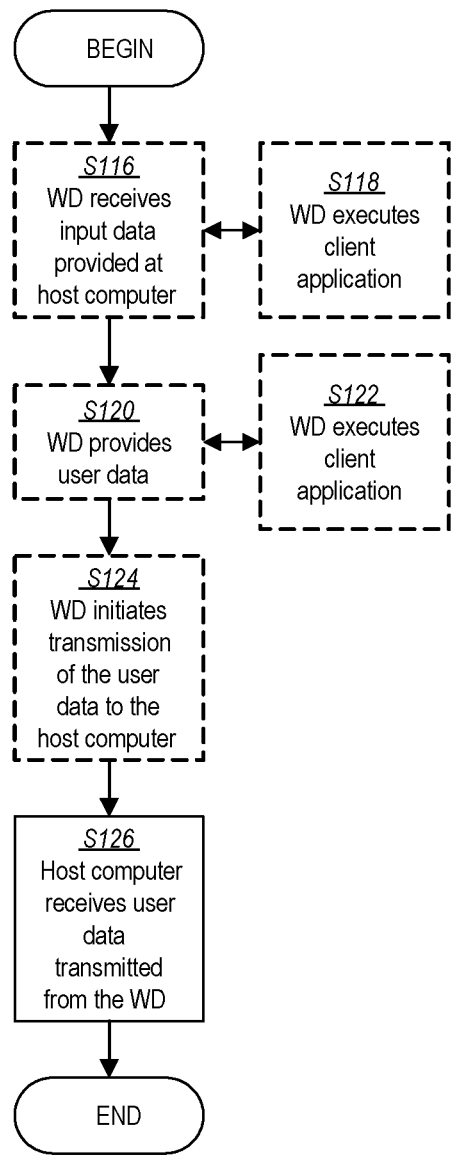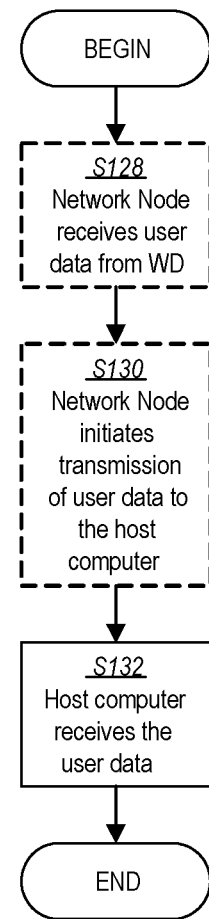
FIG. 5
FIG. 6

FLEXIBLE ENERGY DETECTION IN UNLICENSED SPECTRUM

CROSS-REFERENCE TO RELATED APPLICATIONS

This application is a Submission Under 35 U.S.C. § 371 for U.S. National Stage Patent Application of International Application No.: PCT/EP2020/073903, filed Aug. 26, 2020 entitled "FLEXIBLE ENERGY DETECTION IN UNLICENSED SPECTRUM," which claims priority to U.S. Provisional Application No. 62/891,570, filed Aug. 26, 2019, entitled "FLEXIBLE ENERGY DETECTION IN UNLICENSED SPECTRUM," and U.S. Provisional Application No. 62/993,403, filed Mar. 23, 2020, entitled "FLEXIBLE ENERGY DETECTION IN UNLICENSED SPECTRUM," the entireties of all of which are incorporated herein by reference.

TECHNICAL FIELD

Wireless communication and in particular, to energy detection in unlicensed wireless communication spectrum.

BACKGROUND

Networks Operating in Unlicensed Spectrum

Unlike in licensed spectrum, a carrier in unlicensed spectrum may be simultaneously used by multiple networks each with multiple devices operating within the network. Therefore, some sharing mechanisms are necessary to share the carrier in the unlicensed spectrum. This is typically achieved using a listen-before-talk (LBT) mechanism. A device performing LBT senses the channel and processes the sensing results according to an LBT protocol to assess whether the channel is free or busy. If the channel is found to be free as per the protocol, the device then transmits on the carrier.

The LBT protocol typically involves sensing of the carrier in one or more sensing intervals. The channel is assessed to be busy or idle within each of these sensing intervals. Sensing the medium to be idle can be performed in different ways, e.g. using energy detection, preamble detection or using virtual carrier sensing. Energy detection implies that the radio node listens to the channel and measures the received energy within the sensing interval. The received energy reflects all sources of interference and noise received on the carrier within the sensing interval. If this received energy is lower than a certain threshold (often called the Energy Detection (ED) threshold), the radio node declares that the medium is idle. Otherwise, the node declares that the medium is busy (or occupied).

Sensing as described above is typically performed for a random number of sensing intervals with this random number being a number within the range of 0 to CW, where CW represents a contention window size. Initially, a backoff counter is initialized to this random number drawn within 0 and CW. When a busy carrier is sensed to have become idle, a device waits for a fixed period also known as a prioritization period, after which the device can sense the carrier in units of the sensing interval. For each sensing interval within which the carrier is sensed to be idle, the backoff counter is decremented. When the backoff counter reaches zero, the device can transmit on the carrier. After transmission, if a collision is detected via the reception of a negative acknowledgement or by some other means, the contention window size, CW, is typically doubled.

Upon gaining access to the channel using an LBT procedure, the device is allowed to transmit, with the transmission being referred to as a channel occupancy. There are typically limits placed on the duration of a channel occupancy referred to as the maximum channel occupancy time (MCOT) which depends on the lowest priority class traffic being carried by the transmission.

SUMMARY

Some embodiments advantageously provide methods, systems, and apparatuses for energy detection in unlicensed spectrum.

In one embodiment, a method implemented in a network node includes optionally, configuring a wireless device (WD) with the plurality of listen-before-talk parameters, the configuration indicating, for each of a plurality of ED threshold values, a corresponding set of listen-before-talk parameters to be used for the transmission; and/or receiving a transmission in an unlicensed spectrum according to at least one out of a plurality of listen-before-talk parameters, the at least one out of the plurality of listen-before-talk parameters being based on an energy detection (ED) threshold value used to access a channel in the unlicensed spectrum.

In one embodiment, a method in a wireless device (WD) includes selecting at least one out of a plurality of listen-before-talk parameters based at least in part on an energy detection (ED) threshold value used to access a channel in an unlicensed spectrum; and performing a transmission in the unlicensed spectrum according to the selected at least one out of the plurality of listen-before-talk parameters.

According to an aspect of the present disclosure, a method implemented in a radio node is provided. The method includes determining: (i) a maximum channel occupancy time, MCOT, value; and (ii) at least one listen-before-talk, LBT, parameter setting, the MCOT value and/or the at least one LBT parameter setting for one or more LBT parameters depending on an energy detection, ED, threshold value used to access a channel in an unlicensed spectrum; and performing a LBT procedure to gain access to the channel and a transmission on the channel according to the LBT parameter settings and the MCOT value.

In some embodiments of this aspect, the MCOT value depends on the ED threshold value used to access the channel. In some embodiments of this aspect, the MCOT value decreases as the ED threshold value increases. In some embodiments of this aspect, the at least one LBT parameter setting comprises a set of contention window sizes; and the set of contention window sizes depends on the ED threshold value used to access the channel. In some embodiments of this aspect, the at least one LBT parameter setting comprises a defer period; and a value of the defer period depends on the ED threshold value used to access the channel. In some embodiments of this aspect, the MCOT value and/or the at least one LBT parameter setting for the one or more LBT parameters further depends on a priority class.

In some embodiments of this aspect, the method further includes selecting a contention window size from the set of contention window sizes for the LBT procedure based at least in part on whether a previous transmission on the channel is successful. In some embodiments of this aspect, the selecting further comprises selecting the ED threshold value according to a restriction associated with the ED threshold value. In some embodiments of this aspect, when the ED threshold value used to access the channel in the unlicensed spectrum is increased, as compared to a previous ED threshold value used to access the channel, the determining the MCOT value and/or that at least one LBT parameter setting comprises at least one of: decreasing a maximum channel occupancy time for the transmission; increasing a minimum contention window size for the transmission; increasing a maximum contention window size for the transmission; and increasing a defer period for the transmission.

In some embodiments of this aspect, the at least one LBT parameter setting comprises a maximum duty cycle value; and the maximum duty cycle value depends on the ED threshold value used to access the channel. In some embodiments of this aspect, the method further includes obtaining a configuration indicating the at least one LBT parameter setting. In some embodiments of this aspect, at least one of: the configuration indicates, for each of a plurality of ED threshold values, a corresponding set of LBT parameter settings for the one or more LBT parameters; and the configuration is based at least in part on an observed channel measurement. In some embodiments of this aspect, the method further includes obtaining a channel measurement report, the configuration being based at least in part on the channel measurement report.

In some embodiments of this aspect, the method further includes obtaining scheduling information, the scheduling information being determined based at least in part on at least one of: the ED threshold value; and the MCOT value and/or the at least one LBT parameter setting for the one or more LBT parameters. In some embodiments of this aspect, the method further includes determining the ED threshold value used to access the channel; and adjusting scheduling and/or at least one hybrid automatic repeat request, HARQ, configuration in dependence on the MCOT value and/or the at least one LBT parameter setting associated with the ED threshold value. In some embodiments of this aspect, the method further includes determining the ED threshold value in dependence on: (i) scheduling requirements at the radio node; and (ii) the MCOT value and/or the at least one LBT parameter setting associated with the ED threshold value.

In some embodiments of this aspect, the method further includes as a result of deferring to a second radio node during a channel access procedure in which energy from the second radio node is received at a lower value than the ED threshold value used by the radio node during the channel access procedure: using an MCOT value or at least one listen-before-talk parameter setting for at least one LBT parameter that corresponds to a lower ED threshold value for a next transmission after the channel access procedure. In some embodiments of this aspect, the method further includes as a result of deferring to a second radio node during a channel access procedure: when detecting an energy level greater than the ED threshold during the channel access procedure, using an MCOT value or at least one listen-before-talk parameter setting for at least one LBT parameter that corresponds to the ED threshold value for a next transmission after the channel access procedure; and otherwise, using an MCOT value or at least one listen-before-talk parameter setting for at least one LBT parameter that corresponds to a lower ED threshold value for the next transmission after the channel access procedure.

In some embodiments of this aspect, the MCOT value or the at least one listen-before-talk parameter setting for the at least one LBT parameter that corresponds to the lower ED threshold value comprises at least one of: a maximum channel occupancy time value, a transmission time limit value, a contention window size, a defer period and a maximum duty cycle. In some embodiments of this aspect, the radio node is a wireless device, WD. In some embodiments of this aspect, the radio node is a network node.

According to another aspect of the present disclosure, a method implemented in a network node is provided. The method includes configuring a wireless device, WD, with a maximum channel occupancy time, MCOT, value and at least one listen-before-talk, LBT, parameter setting for use in performing an LBT procedure to gain access to a channel in an unlicensed spectrum and transmitting on the channel, the MCOT value and/or the at least one LBT parameter setting for one or more LBT parameters depending on an energy detection, ED, threshold value used at the wireless device to access the channel.

In some embodiments of this aspect, the method further includes receiving a transmission from the wireless device in the unlicensed spectrum according to at least one of the MCOT value, the at least one listen-before-talk parameter setting and the configuration. In some embodiments of this aspect, the MCOT value depends on the ED threshold value used at the wireless device to access the channel. In some embodiments of this aspect, the MCOT value decreases as the ED threshold value increases. In some embodiments of this aspect, the at least one LBT parameter setting comprises a set of contention window sizes; and the set of contention window sizes depends on the ED threshold value used at the wireless device to access the channel. In some embodiments of this aspect, the at least one LBT parameter setting comprises a defer period; and a value of the defer period depends on the ED threshold value used at the wireless device to access the channel.

In some embodiments of this aspect, the MCOT value and/or the at least one LBT parameter setting for the one or more LBT parameters further depends on a priority class associated with the wireless device. In some embodiments of this aspect, the configuration includes a restriction associated with the ED threshold value. In some embodiments of this aspect, the configuration indicates that when the ED threshold value used by the wireless device to access the channel in the unlicensed spectrum is increased, as compared to a previous ED threshold value used by the wireless device to access the channel, at least one of: the corresponding MCOT value is decreased; the corresponding at least one LBT parameter setting is increased; a corresponding minimum contention window size is increased; a corresponding maximum contention window size is increased; and a corresponding defer period is increased.

In some embodiments of this aspect, the at least one LBT parameter setting comprises a maximum duty cycle value; and the maximum duty cycle value depends on the ED threshold value used by the wireless device to access the channel. In some embodiments of this aspect, at least one of: the configuration indicates, for each of a plurality of ED threshold values, a corresponding set of LBT parameter settings for the one or more LBT parameters; and the configuration is based at least in part on an observed channel measurement. In some embodiments of this aspect, the configuration is based at least in part on a channel measurement report from the wireless device. In some embodiments of this aspect, the method further includes scheduling the wireless device, the scheduling being determined based at least in part on at least one of: the ED threshold value; and the MCOT value and/or the at least one LBT parameter setting for the one or more LBT parameters.

In some embodiments of this aspect, the method further includes determining the ED threshold value used by the wireless device to access the channel; and adjusting scheduling and/or at least one hybrid automatic repeat request, HARQ, configuration in dependence on the MCOT value and/or the at least one LBT parameter setting associated with the ED threshold value. In some embodiments of this aspect, the method further includes determining the ED threshold value in dependence on: (i) scheduling requirements at the wireless device; and (ii) the MCOT value and/or the at least one LBT parameter setting associated with the ED threshold value.

In some embodiments of this aspect, the configuration indicates that the wireless device is allowed to, as a result of deferring to a radio node during a channel access procedure in which energy from the second radio node is received at a lower value than the ED threshold value used by the wireless device during the channel access procedure: use an MCOT value or at least one listen-before-talk parameter setting for at least one LBT parameter that corresponds to a lower ED threshold value for a next transmission after the channel access procedure.

In some embodiments of this aspect, the configuration indicates that the wireless device is allowed to, as a result of deferring to a second radio node during a channel access procedure: when the wireless device detects an energy level greater than the ED threshold during the channel access procedure, use an MCOT value or at least one listen-before-talk parameter setting for at least one LBT parameter that corresponds to the ED threshold value for a next transmission after the channel access procedure; and otherwise, use an MCOT value or at least one listen-before-talk parameter setting for at least one LBT parameter that corresponds to a lower ED threshold value for the next transmission after the channel access procedure. In some embodiments of this aspect, the at least one listen-before-talk parameter setting that corresponds to the lower ED threshold value comprises at least one of: a maximum channel occupancy time value, a transmission time limit value, a contention window size, a defer period and a maximum duty cycle.

According to yet another aspect of the present disclosure, a method implemented by a wireless device, WD, is provided. The method includes adjusting a contention window size to access a channel for a transmission in an unlicensed spectrum based at least in part on a maximum channel occupancy time, MCOT, value and a transmit duration for the transmission.

In some embodiments of this aspect, the adjusting is based at least in part on at least one scaling factor and the at least scaling factor is based at least in part on the MCOT value and the transmit duration for the transmission.

According to an aspect of the present disclosure, a radio node including processing circuitry is provided. The processing circuitry is configured to cause the radio node to determine: (i) a maximum channel occupancy time, MCOT, value; and (ii) at least one listen-before-talk, LBT, parameter setting, the MCOT value and/or the at least one LBT parameter setting for one or more LBT parameters depending on an energy detection, ED, threshold value used to access a channel in an unlicensed spectrum; and perform a LBT procedure to gain access to the channel and a transmission on the channel according to the LBT parameter settings and the MCOT value.

In some embodiments of this aspect, the MCOT value depends on the ED threshold value used to access the channel. In some embodiments of this aspect, the MCOT value decreases as the ED threshold value increases. In some embodiments of this aspect, the at least one LBT parameter setting comprises a set of contention window sizes; and the set of contention window sizes depends on the ED threshold value used to access the channel. In some embodiments of this aspect, the at least one LBT parameter setting comprises a defer period; and a value of the defer period depends on the ED threshold value used to access the channel. In some embodiments of this aspect, the MCOT value and/or the at least one LBT parameter setting for the one or more LBT parameters further depends on a priority class.

In some embodiments of this aspect, the processing circuitry is further configured to cause the radio node to select a contention window size from the set of contention window sizes for the LBT procedure based at least in part on whether a previous transmission on the channel is successful. In some embodiments of this aspect, the processing circuitry is configured to cause the radio node to select by being configured to cause the radio node to select the ED threshold value according to a restriction associated with the ED threshold value.

In some embodiments of this aspect, when the ED threshold value used to access the channel in the unlicensed spectrum is increased, as compared to a previous ED threshold value used to access the channel, the processing circuitry is configured to cause the radio node to determine the MCOT value and/or that at least one LBT parameter setting by being configured to cause the radio node to at least one of: decrease a maximum channel occupancy time for the transmission; increase a minimum contention window size for the transmission; increase a maximum contention window size for the transmission; and increase a defer period for the transmission.

In some embodiments of this aspect, the at least one LBT parameter setting comprises a maximum duty cycle value; and the maximum duty cycle value depends on the ED threshold value used to access the channel. In some embodiments of this aspect, the processing circuitry is further configured to cause the radio node to obtain a configuration indicating the at least one LBT parameter setting. In some embodiments of this aspect, at least one of: the configuration indicates, for each of a plurality of ED threshold values, a corresponding set of LBT parameter settings for the one or more LBT parameters; and the configuration is based at least in part on an observed channel measurement. In some embodiments of this aspect, the processing circuitry is further configured to cause the radio node to obtain a channel measurement report, the configuration being based at least in part on the channel measurement report.

In some embodiments of this aspect, the processing circuitry is further configured to cause the radio node to obtain scheduling information, the scheduling information being determined based at least in part on at least one of: the ED threshold value; and the MCOT value and/or the at least one LBT parameter setting for the one or more LBT parameters. In some embodiments of this aspect, the processing circuitry is further configured to cause the radio node to determine the ED threshold value used to access the channel; and adjust scheduling and/or at least one hybrid automatic repeat request, HARQ, configuration in dependence on the MCOT value and/or the at least one LBT parameter setting associated with the ED threshold value.

In some embodiments of this aspect, the processing circuitry is further configured to cause the radio node to determine the ED threshold value in dependence on: (i) scheduling requirements at the radio node; and (ii) the MCOT value and/or the at least one LBT parameter setting associated with the ED threshold value. In some embodiments of this aspect, the processing circuitry is further configured to cause the radio node to: as a result of deferring to a second radio node during a channel access procedure in which energy from the second radio node is received at a lower value than the ED threshold value used by the radio node during the channel access procedure: use an MCOT value or at least one listen-before-talk parameter setting for at least one LBT parameter that corresponds to a lower ED threshold value for a next transmission after the channel access procedure.

In some embodiments of this aspect, the processing circuitry is further configured to cause the radio node to: as a result of deferring to a second radio node during a channel access procedure: when detecting an energy level greater than the ED threshold during the channel access procedure, use an MCOT value or at least one listen-before-talk parameter setting for at least one LBT parameter that corresponds to the ED threshold value for a next transmission after the channel access procedure; and otherwise, use an MCOT value or at least one listen-before-talk parameter setting for at least one LBT parameter that corresponds to a lower ED threshold value for the next transmission after the channel access procedure.

In some embodiments of this aspect, the MCOT value or the at least one listen-before-talk parameter setting for the at least one LBT parameter that corresponds to the lower ED threshold value comprises at least one of: a maximum channel occupancy time value, a transmission time limit value, a contention window size, a defer period and a maximum duty cycle. In some embodiments of this aspect, the radio node is a wireless device, WD. In some embodiments of this aspect, the radio node is a network node.

According to another aspect of the present disclosure, a network node including processing circuitry is provided. The processing circuitry is configured to cause the network node to configure a wireless device, WD, with a maximum channel occupancy time, MCOT, value and at least one listen-before-talk, LBT, parameter setting for use in performing an LBT procedure to gain access to a channel in an unlicensed spectrum and transmit on the channel, the MCOT value and/or the at least one LBT parameter setting for one or more LBT parameters depending on an energy detection, ED, threshold value used at the wireless device to access the channel.

In some embodiments of this aspect, the processing circuitry is further configured to cause the network node to receive a transmission from the wireless device in the unlicensed spectrum according to at least one of the MCOT value, the at least one listen-before-talk parameter setting and the configuration. In some embodiments of this aspect, the MCOT value depends on the ED threshold value used at the wireless device to access the channel. In some embodiments of this aspect, the MCOT value decreases as the ED threshold value increases. In some embodiments of this aspect, the at least one LBT parameter setting comprises a set of contention window sizes; and the set of contention window sizes depends on the ED threshold value used at the wireless device to access the channel.

In some embodiments of this aspect, the at least one LBT parameter setting comprises a defer period; and a value of the defer period depends on the ED threshold value used at the wireless device to access the channel. In some embodiments of this aspect, the MCOT value and/or the at least one LBT parameter setting for the one or more LBT parameters further depends on a priority class associated with the wireless device. In some embodiments of this aspect, the configuration includes a restriction associated with the ED threshold value.

In some embodiments of this aspect, the configuration indicates that when the ED threshold value used by the wireless device to access the channel in the unlicensed spectrum is increased, as compared to a previous ED threshold value used by the wireless device to access the channel, at least one of: the corresponding MCOT value is decreased; the corresponding at least one LBT parameter setting is increased; a corresponding minimum contention window size is increased; a corresponding maximum contention window size is increased; and a corresponding defer period is increased.

In some embodiments of this aspect, the at least one LBT parameter setting comprises a maximum duty cycle value; and the maximum duty cycle value depends on the ED threshold value used by the wireless device to access the channel. In some embodiments of this aspect, at least one of: the configuration indicates, for each of a plurality of ED threshold values, a corresponding set of LBT parameter settings for the one or more LBT parameters; and the configuration is based at least in part on an observed channel measurement. In some embodiments of this aspect, the configuration is based at least in part on a channel measurement report from the wireless device.

In some embodiments of this aspect, the processing circuitry is further configured to cause the network node to schedule the wireless device, the scheduling being determined based at least in part on at least one of: the ED threshold value; and the MCOT value and/or the at least one LBT parameter setting for the one or more LBT parameters. In some embodiments of this aspect, the processing circuitry is further configured to cause the network node to determine the ED threshold value used by the wireless device to access the channel; and adjust scheduling and/or at least one hybrid automatic repeat request, HARQ, configuration in dependence on the MCOT value and/or the at least one LBT parameter setting associated with the ED threshold value.

In some embodiments of this aspect, the processing circuitry is further configured to cause the network node to determine the ED threshold value in dependence on: (i) scheduling requirements at the wireless device; and (ii) the MCOT value and/or the at least one LBT parameter setting associated with the ED threshold value. In some embodiments of this aspect, the configuration indicates that the wireless device is allowed to, as a result of deferring to a radio node during a channel access procedure in which energy from the second radio node is received at a lower value than the ED threshold value used by the wireless device during the channel access procedure: use an MCOT value or at least one listen-before-talk parameter setting for at least one LBT parameter that corresponds to a lower ED threshold value for a next transmission after the channel access procedure.

In some embodiments of this aspect, the configuration indicates that the wireless device is allowed to, as a result of deferring to a second radio node during a channel access procedure: when the wireless device detects an energy level greater than the ED threshold during the channel access procedure, use an MCOT value or at least one listen-before-talk parameter setting for at least one LBT parameter that corresponds to the ED threshold value for a next transmission after the channel access procedure; and otherwise, use an MCOT value or at least one listen-before-talk parameter setting for at least one LBT parameter that corresponds to a lower ED threshold value for the next transmission after the channel access procedure.

In some embodiments of this aspect, the at least one listen-before-talk parameter setting that corresponds to the lower ED threshold value comprises at least one of: a maximum channel occupancy time value, a transmission time limit value, a contention window size, a defer period and a maximum duty cycle.

According to an aspect of the present disclosure, a wireless device, WD, including processing circuitry is provided. The processing circuitry is configured to cause the wireless device to adjust a contention window size to access a channel for a transmission in an unlicensed spectrum based at least in part on a maximum channel occupancy time, MCOT, value and a transmit duration for the transmission.

In some embodiments of this aspect, the processing circuitry is further configured to cause the network node to adjust the contention window size based at least in part on at least one scaling factor and the at least scaling factor is based at least in part on the MCOT value and the transmit duration for the transmission.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 3 is a flowchart illustrating exemplary methods implemented in a communication system including a host computer, a network node and a wireless device for executing a client application at a wireless device according to some embodiments of the present disclosure;

FIG. 4 is a flowchart illustrating exemplary methods implemented in a communication system including a host computer, a network node and a wireless device for receiving user data at a wireless device according to some embodiments of the present disclosure;

FIG. 5 is a flowchart illustrating exemplary methods implemented in a communication system including a host computer, a network node and a wireless device for receiving user data from the wireless device at a host computer according to some embodiments of the present disclosure;

FIG. 6 is a flowchart illustrating exemplary methods implemented in a communication system including a host computer, a network node and a wireless device for receiving user data at a host computer according to some embodiments of the present disclosure;

DETAILED DESCRIPTION

Figure 1:
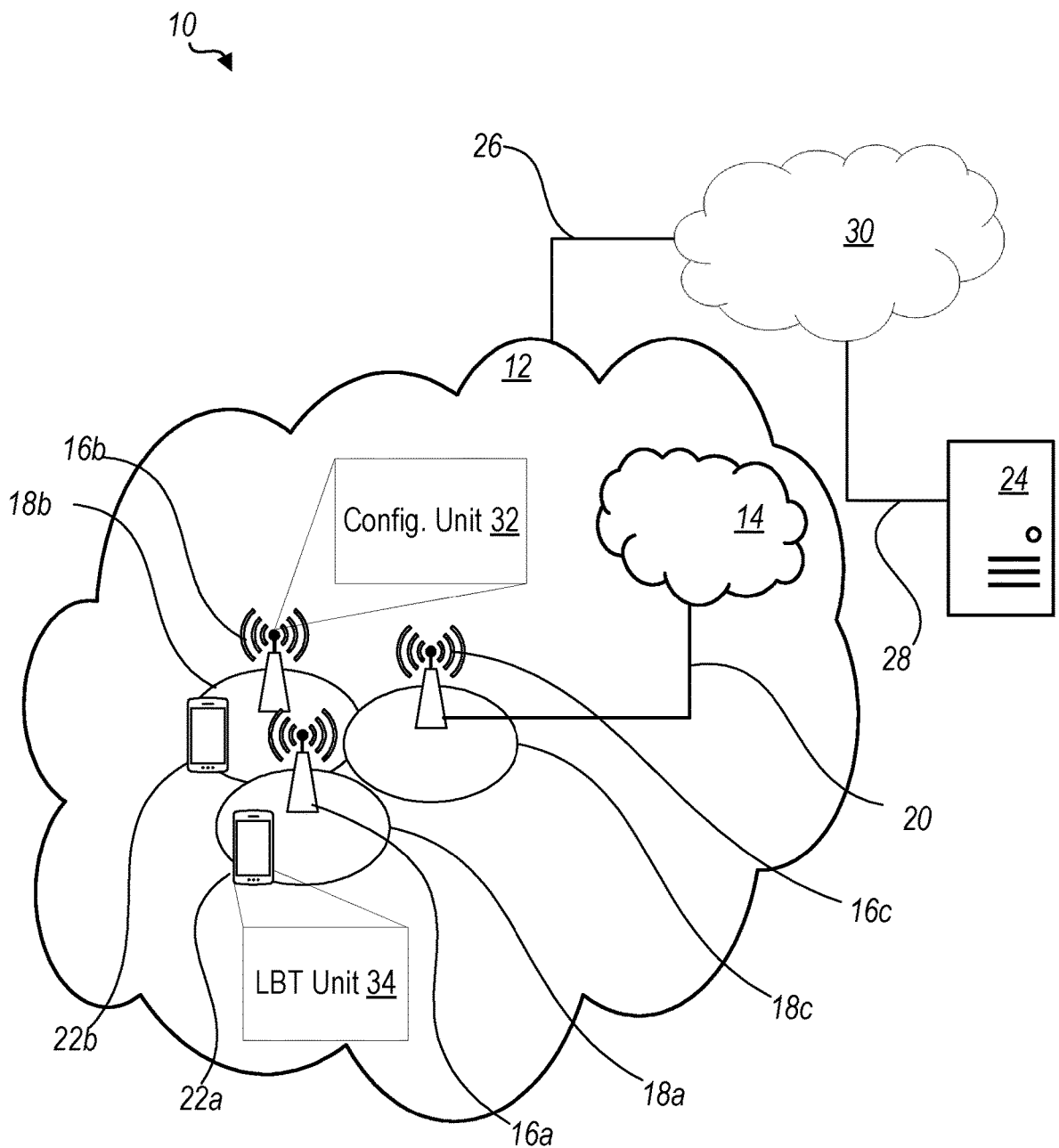
FIG. 1 is a schematic diagram of an exemplary network architecture illustrating a communication system connected via an intermediate network to a host computer according to the principles in the present disclosure.

In unlicensed spectrum, existing solutions for setting the Energy Detection (ED) threshold for users include both fixed settings as well as threshold adaptation. Fixed settings can be performed for all cells, groups of cells, or for all users of a cell. Threshold adaptation based on criteria such as signal-to-noise ratio (SINR), buffer occupancy, throughput, etc. have also been considered. Such mechanisms can be per cell, or per user (i.e., per wireless device and/or user equipment).

A basic technique for resource allocation is controlling inter-cell interference by assigning different frequency resources specifically to different cells. Flexibility of ED threshold for all users of a cell has been employed when such frequency reuse mechanisms are in place. Fractional frequency reuse has been known as a method to increase the efficiency of wireless communication networks. However, its use in unlicensed spectrum has not been studied to the same extent.

In general, one problem with the existing approaches is that the combination of ED threshold adaptation jointly with resource allocation mechanisms have not been adequately considered; thus, resulting in lower system performance than would be achievable using the techniques disclosed in the present disclosure.

Some embodiments of the present disclosure provide for the setting of transmission time limits based on the ED threshold used while sensing during the listen-before-talk operation used to gain access to the channel prior to the transmission. Furthermore, some embodiments of the present disclosure provide for the allowance of different listen-before-talk parameters depending on the energy detection threshold used. The approaches above may be used individually, or jointly.

In some embodiments, these limits and/or allowed LBT parameter settings may be set for devices (e.g., wireless devices (WDs)) in a network by a network node configuring the devices in the network, e.g., via unicast/dedicated, multicast or broadcast signaling or, more strictly, the limits may be set as pre-defined rules, or tables in specifications or regulatory requirements for operation in a certain region.

When the limits are set by a network node, in an embodiment of this disclosure, the transmission time limits and/or allowed parameter settings for listen-before-talk for a given ED threshold may be set based on the observed channel occupancy. The channel occupancy may be indicative of a portion of resources and/or signals/channels for which the channel is sensed to be busy e.g., measured reference signal strength indicator (RSSI) is above a threshold. Channel occupancy may also be a channel busy ratio (or CBR), channel occupancy ratio (CR), RSSI measurement, or similar. The channel occupancy may be reported or indicated to a network node to facilitate such configuring of the transmission time limits and/or allowed LBT parameter settings by the network node.

Some embodiments of the present disclosure further include embodiments that show how radio nodes, such as WDs or network nodes, may operate in adherence to the transmission time limits and/or allowed LBT parameter settings. In some embodiments, at a scheduling device such as a network node (e.g., gNB), the different transmission time limits and/or allowed LBT parameter settings may impact the scheduling in the transmitting radio (trying to obtain the access), Hybrid Automatic Repeat reQuest (HARQ) configuration, etc. Alternatively, in some embodiments, based on the scheduling and the communication requirements (including, e.g., the amount of data and priority for the data), the radio node determines the ED threshold to be used which in turn determines the transmission time limits and/or allowed LBT parameter settings.

The proposed solutions in this disclosure may allow better optimization of reuse within a wireless network operating in unlicensed spectrum while controlling the interference to neighboring devices.

Before describing in detail exemplary embodiments, it is noted that the embodiments reside primarily in combinations of apparatus components and processing steps related to energy detection in unlicensed spectrum. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IoT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

In some embodiments, the phrase "one or more LBT parameters" or "set of LBT parameters" may refer to parameters associated with the LBT procedure (e.g., contention window size; defer period; etc.). In some embodiments, the phrase "LBT parameter settings" may refer to the settings for those parameters, e.g., parameter values, maximum and minimum values, available sets of values, etc., some of which may depend on the energy detection threshold as described in the present disclosure.

In some embodiments, predefined in the context of this disclosure may refer to the related information being defined for example in a standard, and/or being available without specific configuration from a network or network node, e.g. stored in memory in WD, for example independent of being configured. Configured or configurable may be considered to pertain to the corresponding information being set/configured, e.g. by the network or a network node (e.g., RRC signaling).

In some embodiments, a "set" as used herein may be a set of 1 or more elements in the set.

In some embodiments, the term "obtain" or "obtaining" is used herein and may indicate obtaining in e.g., memory such as in the case where the information is predefined. The term "obtain" or "obtaining" as used herein may also indicate obtaining by receiving signaling indicating the information obtained.

Configuring a Radio Node

Configuring a radio node, in particular a terminal or user equipment or the WD, may refer to the radio node being adapted or caused or set and/or instructed to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources, or e.g., configuration for performing certain measurements on certain subframes or radio resources. A radio node may configure itself, e.g., based on configuration data received from a network or network node. A network node may use, and/or be adapted to use, its circuitry/ies for configuring. Allocation information may be considered a form of configuration data. Configuration data may comprise and/or be represented by configuration information, and/or one or more corresponding indications and/or message/s.

Configuring in General

Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal (e.g. WD) may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor. In particular, configuring a terminal (e.g. WD) may comprise configuring the WD to perform certain measurements on certain subframes or radio resources and reporting such measurements according to embodiments of the present disclosure.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide arrangements for energy detection in unlicensed spectrum.

Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). In some embodiments, one or more of the coverage areas 18a, 18b, 18c may be provided by and/or include unlicensed wireless communications spectrum. Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over)

to a connected WD 22a. Similarly, the network node 16 need not be aware of the future routing of an outgoing uplink communication originating from the WD 22a towards the host computer 24.

A network node 16 is configured to include a configuration unit 32 which is configured to configure a wireless device, WD, the configuration indicating a plurality of listen-before-talk parameter values, and the configuration indicating at least one listen-before-talk parameter value to be used for a transmission on a channel, the at least one listen-before-talk parameter value out of the plurality of listen-before-talk parameter values being based at least in part on an energy detection, ED, threshold value used at the WD to access the channel in an unlicensed spectrum. In some embodiments, network node 16 is configured to include a configuration unit 32 which is configured to optionally, configure the WD with the plurality of listen-before-talk parameters, the configuration indicating, for each of a plurality of ED threshold values, a corresponding set of listen-before-talk parameters to be used for the transmission; and/or receive a transmission in an unlicensed spectrum according to at least one out of a plurality of listen-before-talk parameters, the at least one out of the plurality of listen-before-talk parameters being based on an energy detection (ED) threshold value used to access a channel in the unlicensed spectrum.

A radio node, such as wireless device 22 and/or network node 16, is configured to include a LBT unit 34 which is configured to select at least one listen-before-talk parameter value out of a plurality of listen-before-talk parameter values based at least in part on an energy detection, ED, threshold value used to access a channel in an unlicensed spectrum; and perform a transmission on the channel in the unlicensed spectrum according to the selected at least one listen-before-talk parameter value. In some embodiments, radio node, such as wireless device 22 and/or network node 16, is configured to include a LBT unit 34 which is configured to select at least one out of a plurality of listen-before-talk parameters based at least in part on an energy detection (ED) threshold value used to access a channel in an unlicensed spectrum; and perform a transmission in the unlicensed spectrum according to the selected at least one out of the plurality of listen-before-talk parameters.

In some embodiments, wireless device 22 is configured to include a LBT unit 34 which is configured to adjust a contention window size to access a channel for a transmission in an unlicensed spectrum based at least in part on a maximum transmission limit and a transmit duration for the transmission.

Example implementations, in accordance with an embodiment, of the WD 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or the wireless device 22. The processing circuitry 42 of the host computer 24 may include a monitor unit 54 configured to enable the service provider to observe, monitor, control, transmit to and/or receive from the network node 16 and/or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include configuration unit 32 configured to perform network node methods discussed herein, such as the methods discussed with reference to FIGS. 7 and 8, as well as other figures.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include an LBT unit 34 configured to perform WD methods discussed herein, such as the methods discussed with reference to FIGS. 8 and 9, as well as other figures.

Figure 2:
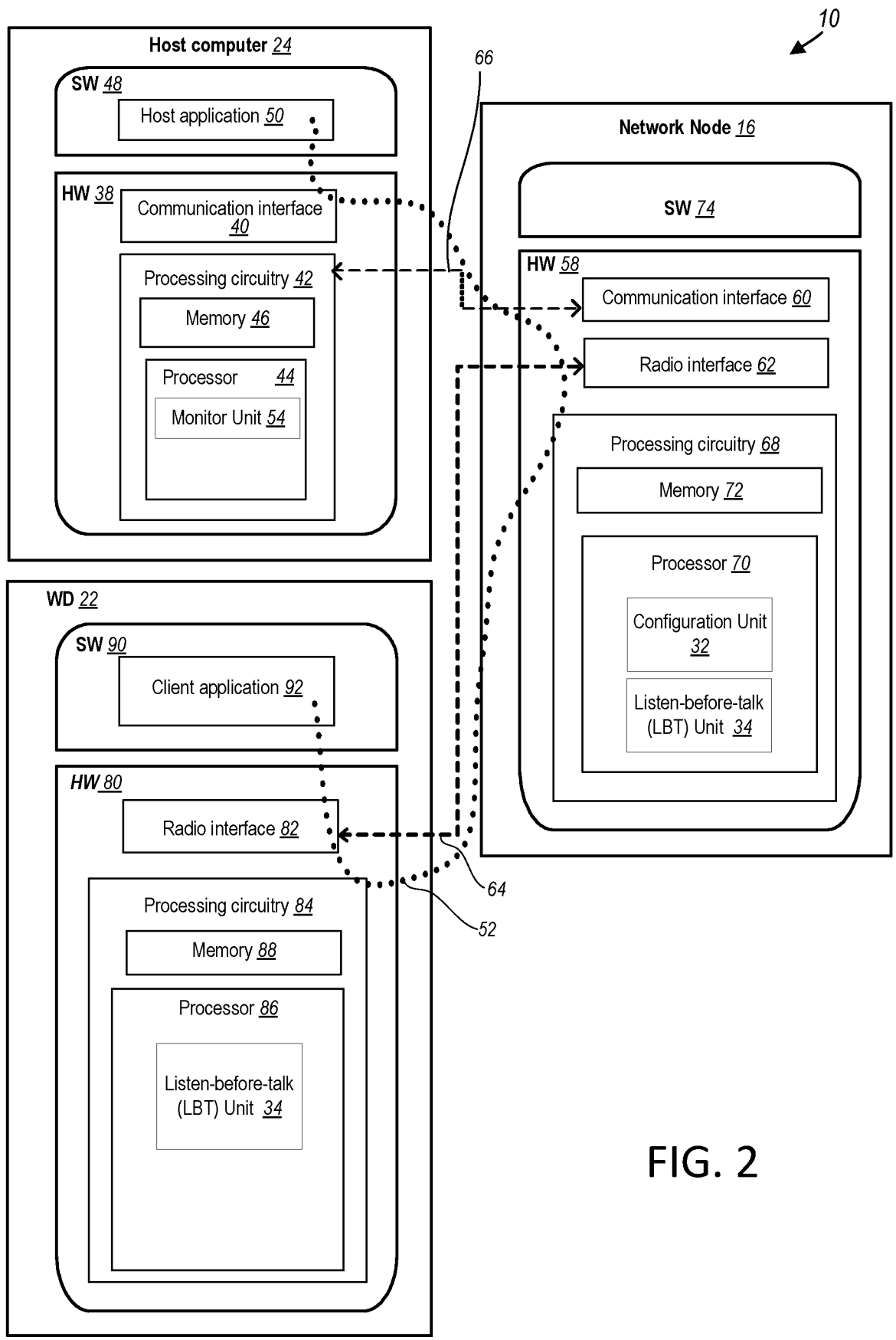
FIG. 2 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 1 and 2 show various "units" such as configuration unit 32, and LBT unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 3 is a flowchart illustrating an exemplary method implemented in a communication system, such as, for example, the communication system of FIGS. 1 and 2, in accordance with one embodiment. The communication system may include a host computer 24, a network node 16 and a WD 22, which may be those described with reference to FIG. 2. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 4 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

FIG. 5 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 6 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 7:
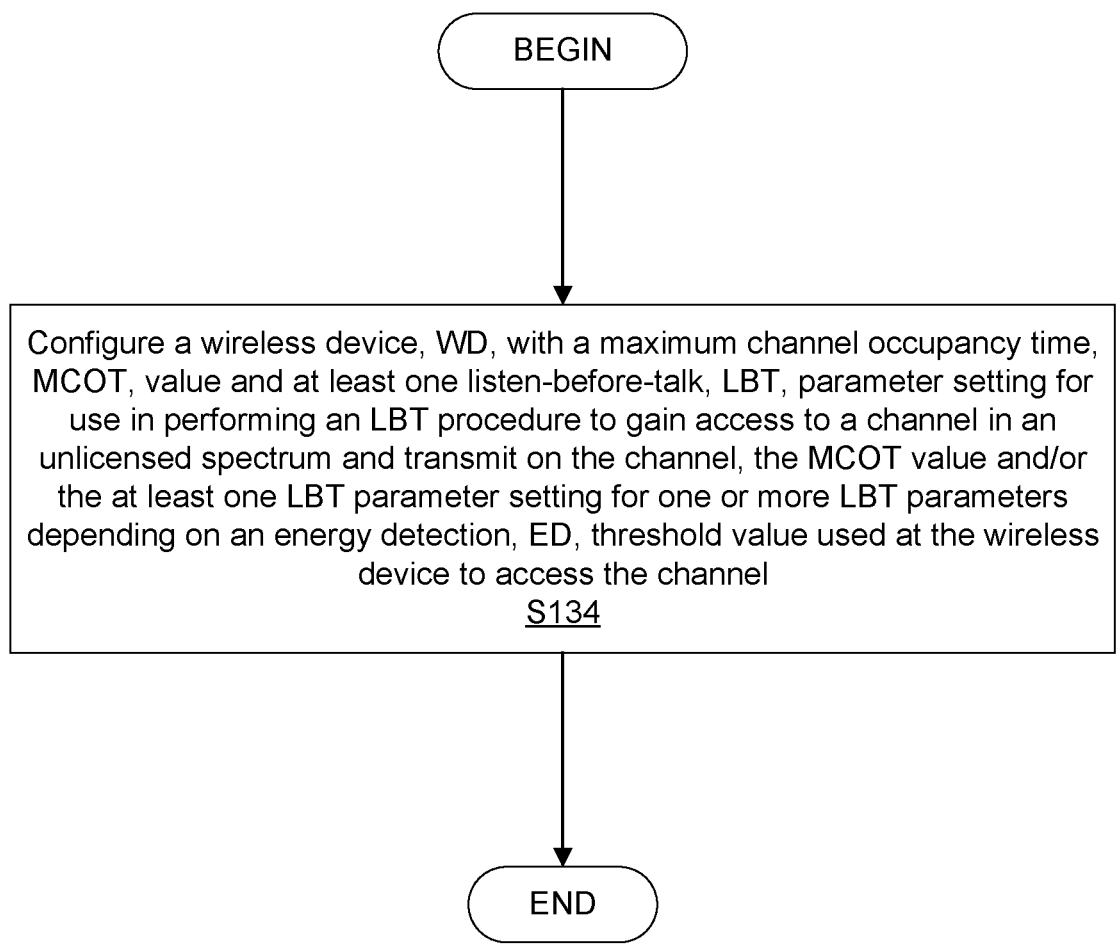
FIG. 7 is a flowchart of an exemplary process in a network node for a configuration unit according to some embodiments of the present disclosure.

FIG. 7 is a flowchart of an exemplary process in a network node 16 for energy detection in unlicensed spectrum, such as for example in a coverage area 18 that comprises unlicensed wireless communication spectrum according to some embodiments of the present disclosure. One or more Blocks and/or functions and/or methods performed by the network node 16 may be performed by one or more elements of network node 16 such as by configuration unit 32 in processing circuitry 68, processor 70, communication interface 60, radio interface 62, etc. according to the example method. The example method includes configuring (Block S134), such as via configuration unit 32, processing circuitry 68, processor 70, communication interface 60 and/or radio interface 62, a wireless device (22), WD, with a maximum channel occupancy time, MCOT, value and at least one listen-before-talk, LBT, parameter setting for use in performing an LBT procedure to gain access to a channel in an unlicensed spectrum and transmitting on the channel, the MCOT value and/or the at least one LBT parameter setting for one or more LBT parameters depending on an energy detection, ED, threshold value used at the wireless device (22) to access the channel.

In some embodiments, the method further includes receiving, such as via configuration unit 32, processing circuitry 68, processor 70, communication interface 60 and/or radio interface 62, a transmission from the wireless device 22 in the unlicensed spectrum according to at least one of the MCOT value, the at least one listen-before-talk parameter setting and the configuration. In some embodiments, the MCOT value depends on the ED threshold value used at the wireless device 22 to access the channel. In some embodiments, the MCOT value decreases as the ED threshold value increases. In some embodiments, the at least one LBT parameter setting comprises a set of contention window sizes; and the set of contention window sizes depends on the ED threshold value used at the wireless device 22 to access the channel. In some embodiments, the at least one LBT parameter setting comprises a defer period; and a value of the defer period depends on the ED threshold value used at the wireless device 22 to access the channel.

In some embodiments, the MCOT value and/or the at least one LBT parameter setting for the one or more LBT parameters further depends on a priority class associated with the wireless device 22. In some embodiments, the configuration includes a restriction associated with the ED threshold value. In some embodiments, the configuration indicates that when the ED threshold value used by the wireless device 22 to access the channel in the unlicensed spectrum is increased, as compared to a previous ED threshold value used by the wireless device 22 to access the channel, at least one of: the corresponding MCOT value is decreased; the corresponding at least one LBT parameter setting is increased; a corresponding minimum contention window size is increased; a corresponding maximum contention window size is increased; and a corresponding defer period is increased, such as via configuration unit 32, processing circuitry 68, processor 70, communication interface 60 and/or radio interface 62.

In some embodiments, the at least one LBT parameter setting comprises a maximum duty cycle value; and the maximum duty cycle value depends on the ED threshold value used by the wireless device 22 to access the channel. In some embodiments, at least one of: the configuration indicates, for each of a plurality of ED threshold values, a corresponding set of LBT parameter settings for the one or more LBT parameters; and the configuration is based at least in part on an observed channel measurement. In some embodiments, the configuration is based at least in part on a channel measurement report from the wireless device 22. In some embodiments, the method further includes scheduling, such as via configuration unit 32, processing circuitry 68, processor 70, communication interface 60 and/or radio interface 62, the wireless device 22, the scheduling being determined based at least in part on at least one of: the ED threshold value; and the MCOT value and/or the at least one LBT parameter setting for the one or more LBT parameters.

In some embodiments, the method further includes determining, such as via configuration unit 32, processing circuitry 68, processor 70, communication interface 60 and/or radio interface 62, the ED threshold value used by the wireless device 22 to access the channel; and adjusting, such as via configuration unit 32, processing circuitry 68, processor 70, communication interface 60 and/or radio interface 62, scheduling and/or at least one hybrid automatic repeat request, HARQ, configuration in dependence on the MCOT value and/or the at least one LBT parameter setting associated with the ED threshold value.

In some embodiments, the method further includes determining the ED threshold value in dependence on: (i) scheduling requirements at the wireless device 22; and (ii) the MCOT value and/or the at least one LBT parameter setting associated with the ED threshold value. In some embodiments, the configuration indicates that the wireless device 22 is allowed to, as a result of deferring to a radio node during a channel access procedure in which energy from the second radio node is received at a lower value than the ED threshold value used by the wireless device 22 during the channel access procedure: use an MCOT value or at least one listen-before-talk parameter setting for at least one LBT parameter that corresponds to a lower ED threshold value for a next transmission after the channel access procedure.

In some embodiments, the configuration indicates that the wireless device 22 is allowed to, as a result of deferring to a second radio node during a channel access procedure: when the wireless device 22 detects an energy level greater than the ED threshold during the channel access procedure, use an MCOT value or at least one listen-before-talk parameter setting for at least one LBT parameter that corresponds to the ED threshold value for a next transmission after the channel access procedure; and otherwise, use an MCOT value or at least one listen-before-talk parameter setting for at least one LBT parameter that corresponds to a lower ED threshold value for the next transmission after the channel access procedure. In some embodiments, the at least one listen-before-talk parameter setting that corresponds to the lower ED threshold value comprises at least one of: a maximum channel occupancy time value, a transmission time limit value, a contention window size, a defer period and a maximum duty cycle.

Some embodiments may include optionally configuring, such as via configuration unit 32, processing circuitry 68, processor 70 and/or radio interface 62, a wireless device (WD) 22 with a plurality of listen-before-talk (LBT) parameters, the configuration indicating, for each of a plurality of energy detection (ED) threshold values, a corresponding set of listen-before-talk parameters to be used for the transmission. The method includes receiving, such as via configuration unit 32, processing circuitry 68, processor 70 and/or radio interface 62, a transmission in an unlicensed spectrum according to at least one out of a plurality of listen-before-talk parameters, the at least one out of the plurality of listen-before-talk parameters being based on an ED threshold value used to access a channel in the unlicensed spectrum.

In some embodiments, the plurality of listen-before-talk parameters includes at least one of a maximum channel occupancy time and/or transmission time limits and/or contention window sizes and/or defer periods and/or packet error rates and/or duty cycles. In some embodiments, the method further includes scheduling the WD 22 and/or configuring hybrid automatic repeat request (HARQ) feedback based on at least one of the ED threshold value and/or the at least one out of the plurality of listen-before-talk parameters used for the transmission.

Figure 8:
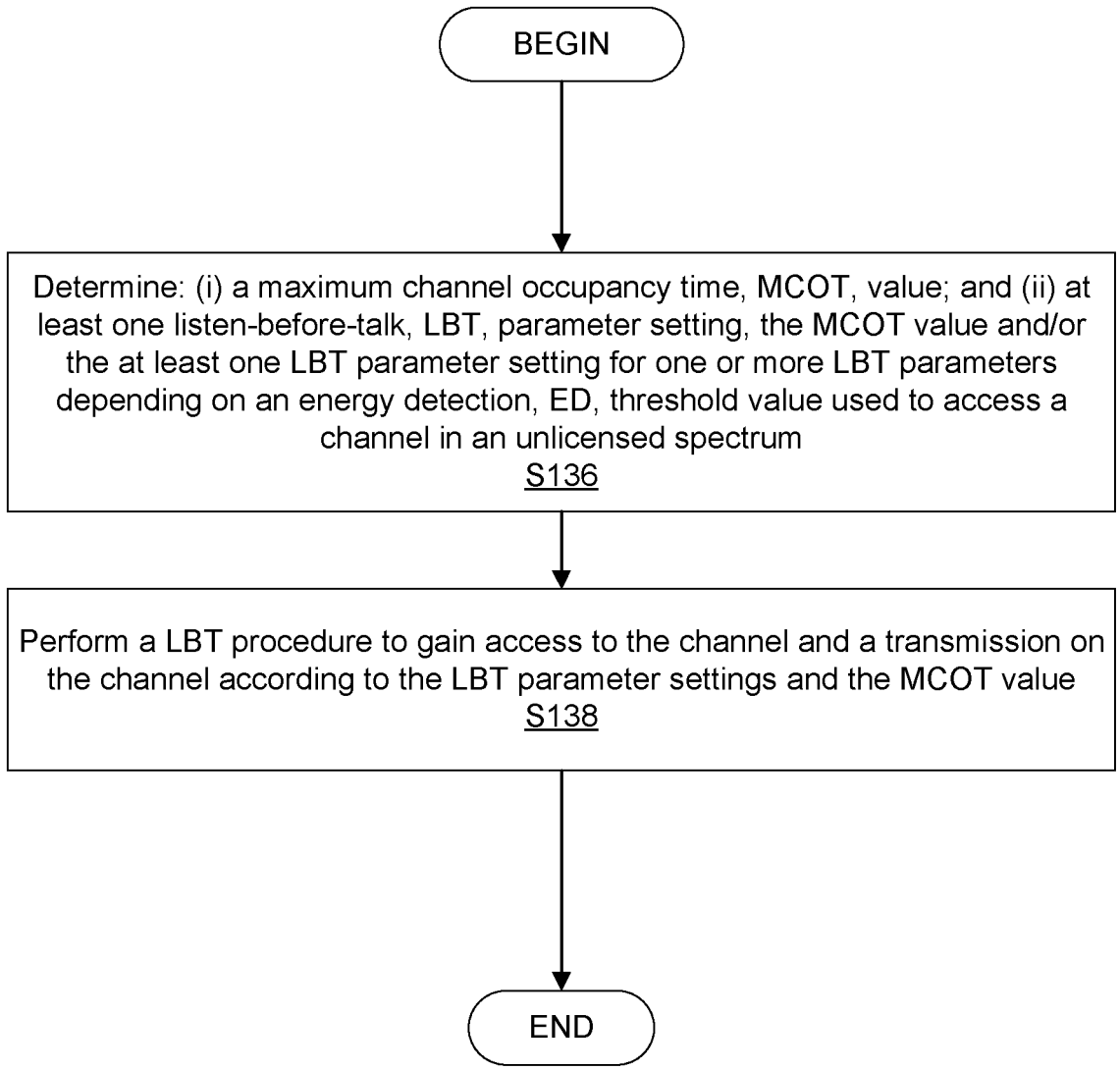
FIG. 8 is a flowchart of an exemplary process in a radio node (e.g., wireless device, network node, etc.) for a listen-before-talk (LBT) unit according to some embodiments of the present disclosure.

FIG. 8 is a flowchart of an exemplary process in a radio node, such as wireless device 22 and/or network node 16, for energy detection in unlicensed wireless communication spectrum according to some embodiments of the present disclosure. One or more Blocks and/or functions and/or methods performed by the radio node, such as WD 22 may be performed by one or more elements of WD 22 such as by listen-before-talk (LBT) unit 34 in processing circuitry 84, processor 86, radio interface 82, etc. One or more Blocks and/or functions and/or methods performed by the radio node, such as the network node 16 may be performed by one or more elements of network node 16 such as by configuration unit 32 in processing circuitry 68, processor 70, communication interface 60, radio interface 62, etc. according to the example method. The example method includes determining (Block S136), such as via listen-before-talk (LBT) unit 34, processing circuitry 84, processor 86 and/or radio interface 82 at the wireless device 22 or configuration unit 32, processing circuitry 68, processor 70, communication interface 60 and/or radio interface 62 at the network node 16: (i) a maximum channel occupancy time, MCOT, value; and (ii) at least one listen-before-talk, LBT, parameter setting, the MCOT value and/or the at least one LBT parameter setting for one or more LBT parameters depending on an energy detection, ED, threshold value used to access a channel in an unlicensed spectrum. The method includes performing (Block S138), such as via listen-before-talk (LBT) unit 34, processing circuitry 84, processor 86 and/or radio interface 82 at the wireless device 22 or configuration unit 32, processing circuitry 68, processor 70, communication interface 60 and/or radio interface 62 at the network node 16, a LBT procedure to gain access to the channel and a transmission on the channel according to the at least one LBT parameter setting and the MCOT value.

In some embodiments, the MCOT value depends on the ED threshold value used to access the channel. In some embodiments, the MCOT value decreases as the ED threshold value increases. In some embodiments, the at least one LBT parameter setting comprises a set of contention window sizes; and the set of contention window sizes depends on the ED threshold value used to access the channel. In some embodiments, the at least one LBT parameter setting comprises a defer period; and a value of the defer period depends on the ED threshold value used to access the channel. In some embodiments, the MCOT value and/or the at least one LBT parameter setting for the one or more LBT parameters further depends on a priority class. In some embodiments, the method includes selecting, such as via listen-before-talk (LBT) unit 34, processing circuitry 84, processor 86 and/or radio interface 82 at the wireless device 22 or configuration unit 32, processing circuitry 68, processor 70, communication interface 60 and/or radio interface 62 at the network node 16, a contention window size from the set of contention window sizes for the LBT procedure based at least in part on whether a previous transmission on the channel is successful.

In some embodiments, the selecting further comprises selecting, such as via listen-before-talk (LBT) unit 34, processing circuitry 84, processor 86 and/or radio interface 82 at the wireless device 22 or configuration unit 32, processing circuitry 68, processor 70, communication interface 60 and/or radio interface 62 at the network node 16, the ED threshold value according to a restriction associated with the ED threshold value.

In some embodiments, when the ED threshold value used to access the channel in the unlicensed spectrum is increased, as compared to a previous ED threshold value used to access the channel, the determining the MCOT value and/or that at least one LBT parameter setting comprises at least one of: decreasing a maximum channel occupancy time for the transmission; increasing a minimum contention window size for the transmission; increasing a maximum contention window size for the transmission; and increasing a defer period for the transmission, such as via listen-before-talk (LBT) unit 34, processing circuitry 84, processor 86 and/or radio interface 82 at the wireless device 22 or configuration unit 32, processing circuitry 68, processor 70, communication interface 60 and/or radio interface 62 at the network node 16.

In some embodiments, the at least one LBT parameter setting comprises a maximum duty cycle value; and the maximum duty cycle value depends on the ED threshold value used to access the channel. In some embodiments, the method further includes obtaining, such as via listen-before-talk (LBT) unit 34, processing circuitry 84, processor 86 and/or radio interface 82 at the wireless device 22 or configuration unit 32, processing circuitry 68, processor 70, communication interface 60 and/or radio interface 62 at the network node 16, a configuration indicating the at least one LBT parameter setting.

In some embodiments, the configuration indicates, for each of a plurality of ED threshold values, a corresponding set of LBT parameter settings for the one or more LBT parameters; and/or the configuration is based at least in part on an observed channel measurement. In some embodiments, the method further includes obtaining, such as via listen-before-talk (LBT) unit 34, processing circuitry 84, processor 86 and/or radio interface 82 at the wireless device 22 or configuration unit 32, processing circuitry 68, processor 70, communication interface 60 and/or radio interface 62 at the network node 16, a channel measurement report, the configuration being based at least in part on the channel measurement report.

In some embodiments, the method further includes obtaining, such as via listen-before-talk (LBT) unit 34, processing circuitry 84, processor 86 and/or radio interface 82 at the wireless device 22 or configuration unit 32, processing circuitry 68, processor 70, communication interface 60 and/or radio interface 62 at the network node 16, scheduling information, the scheduling information being determined based at least in part on at least one of: the ED threshold value; and the MCOT value and/or the at least one LBT parameter setting for the one or more LBT parameters.

In some embodiments, the method further includes determining, such as via listen-before-talk (LBT) unit 34, processing circuitry 84, processor 86 and/or radio interface 82 at the wireless device 22 or configuration unit 32, processing circuitry 68, processor 70, communication interface 60 and/or radio interface 62 at the network node 16, the ED threshold value used to access the channel; and adjusting, such as via listen-before-talk (LBT) unit 34, processing circuitry 84, processor 86 and/or radio interface 82 at the wireless device 22 or configuration unit 32, processing circuitry 68, processor 70, communication interface 60 and/or radio interface 62 at the network node 16, scheduling and/or at least one hybrid automatic repeat request, HARQ, configuration in dependence on the MCOT value and/or the at least one LBT parameter setting associated with the ED threshold value.

In some embodiments, the method includes determining, such as via listen-before-talk (LBT) unit 34, processing circuitry 84, processor 86 and/or radio interface 82 at the wireless device 22 or configuration unit 32, processing circuitry 68, processor 70, communication interface 60 and/or radio interface 62 at the network node 16, the ED threshold value in dependence on: (i) scheduling requirements at the radio node; and (ii) the MCOT value and/or the at least one LBT parameter setting associated with the ED threshold value. In some embodiments, the method further includes, as a result of deferring to a second radio node during a channel access procedure in which energy from the second radio node is received at a lower value than the ED threshold value used by the radio node during the channel access procedure: using, such as via listen-before-talk (LBT) unit 34, processing circuitry 84, processor 86 and/or radio interface 82 at the wireless device 22 or configuration unit 32, processing circuitry 68, processor 70, communication interface 60 and/or radio interface 62 at the network node 16, an MCOT value or at least one listen-before-talk parameter setting for at least one LBT parameter that corresponds to a lower ED threshold value for a next transmission after the channel access procedure.

In some embodiments, the method further includes, as a result of deferring, such as via listen-before-talk (LBT) unit 34, processing circuitry 84, processor 86 and/or radio interface 82 at the wireless device 22 or configuration unit 32, processing circuitry 68, processor 70, communication interface 60 and/or radio interface 62 at the network node 16, to a second radio node during a channel access procedure: when detecting an energy level greater than the ED threshold during the channel access procedure, using, such as via listen-before-talk (LBT) unit 34, processing circuitry 84, processor 86 and/or radio interface 82 at the wireless device 22 or configuration unit 32, processing circuitry 68, processor 70, communication interface 60 and/or radio interface 62 at the network node 16, an MCOT value or at least one listen-before-talk parameter setting for at least one LBT parameter that corresponds to the ED threshold value for a next transmission after the channel access procedure; and otherwise, using, such as via listen-before-talk (LBT) unit 34, processing circuitry 84, processor 86 and/or radio interface 82 at the wireless device 22 or configuration unit 32, processing circuitry 68, processor 70, communication interface 60 and/or radio interface 62 at the network node 16, an MCOT value or at least one listen-before-talk parameter setting for at least one LBT parameter that corresponds to a lower ED threshold value for the next transmission after the channel access procedure.

In some embodiments, the MCOT value or the at least one listen-before-talk parameter setting for the at least one LBT parameter that corresponds to the lower ED threshold value comprises at least one of: a maximum channel occupancy time value, a transmission time limit value, a contention window size, a defer period and a maximum duty cycle. In some embodiments, the radio node is a wireless device 22, WD. In some embodiments, the radio node is a network node 16.

Figure 9:
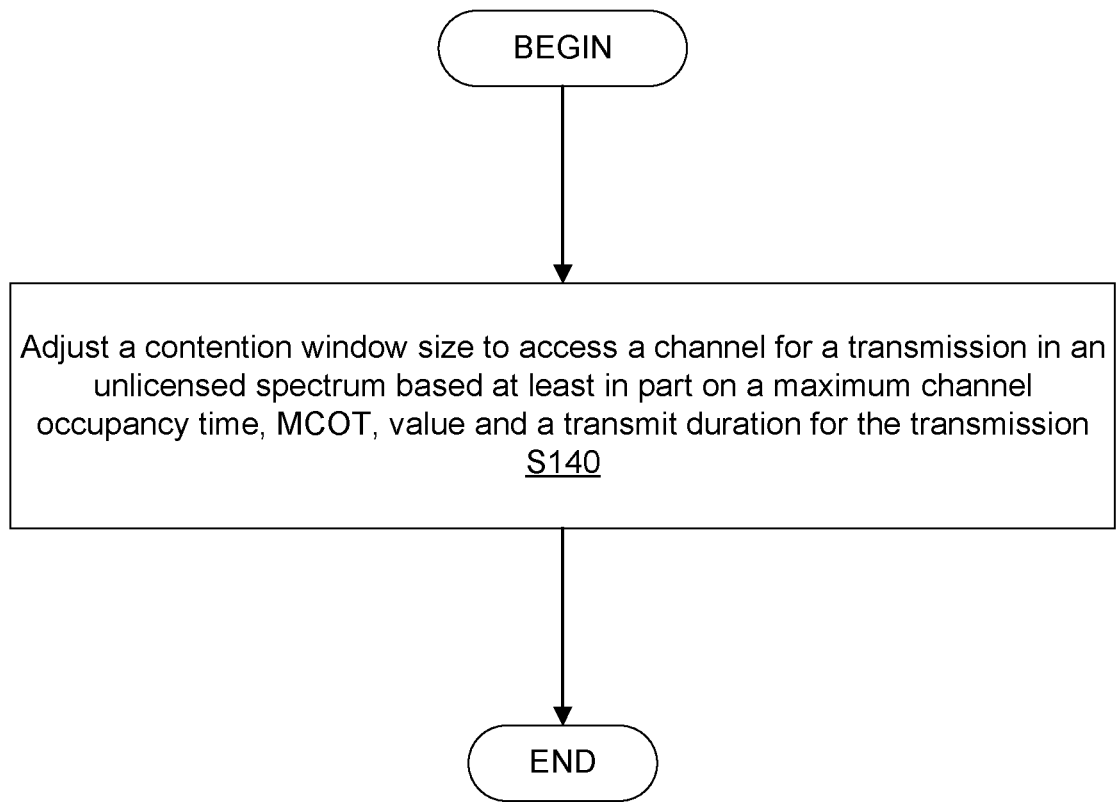
FIG. 9 is a flowchart of an example process in a wireless device according to some embodiments of the present disclosure.

FIG. 9 is a flowchart of an exemplary process in a wireless device 22 for energy detection in unlicensed wireless communication spectrum according to some embodiments of the present disclosure. One or more Blocks and/or functions and/or methods performed by WD 22 may be performed by one or more elements of WD 22 such as by listen-before-talk (LBT) unit 34 in processing circuitry 84, processor 86, radio interface 82, etc. The method includes adjusting (Block S140), such as by listen-before-talk (LBT) unit 34, processing circuitry 84, processor 86 and/or radio interface 82, a contention window size to access a channel for a transmission in an unlicensed spectrum based at least in part on a maximum channel occupancy time, MCOT, value and a transmit duration for the transmission.

In some embodiments, the adjusting is based at least in part on at least one scaling factor and the at least scaling factor is based at least in part on the MCOT value and the transmit duration for the transmission.

In some embodiments, the method includes selecting, such as via LBT unit 34, processing circuitry 84, processor 86 and/or radio interface 82, at least one out of a plurality of listen-before-talk parameters based at least in part on an energy detection (ED) threshold value used to access a channel in an unlicensed spectrum. The method includes performing, such as via LBT unit 34, processing circuitry 84, processor 86 and/or radio interface 82, a transmission in the unlicensed spectrum according to the selected at least one out of the plurality of listen-before-talk parameters.

In some embodiments, the plurality of listen-before-talk parameters includes at least one of a maximum channel occupancy time and/or transmission time limits and/or contention window sizes and/or defer periods and/or packet error rates and/or duty cycles. In some embodiments, the method further includes obtaining, such as via LBT unit 34, processing circuitry 84, processor 86 and/or radio interface 82, a configuration of the plurality of listen-before-talk parameters, the configuration indicating, for each of a plurality of ED threshold values, a corresponding set of listen-before-talk parameters to be used for the transmission.

Having described the general process flow of arrangements of the disclosure and having provided examples of hardware and software arrangements for implementing the processes and functions of the disclosure, the sections below provide details and examples of arrangements for flexible energy detection in unlicensed spectrum, which may be implemented by the network node 16, wireless device 22 and/or host computer 24.

Some embodiments of the present disclosure provide arrangements for flexible energy detection in unlicensed spectrum. Transmissions on the unlicensed spectrum, such as transmissions by a radio node (e.g., WD 22, network node 16) may adhere to limits on the total duration of a transmission after performing an LBT procedure to gain access to the channel. Furthermore, specific parameters used for the listen-before-talk procedure may have allowed ranges.

These limits and allowed LBT parameter settings may be set for devices (e.g., WDs 22) in a network by a network node 16 configuring (e.g., via radio interface 62) the WDs 22 in the network, e.g., via unicast/dedicated, multicast or broadcast signaling. Further, in some embodiments, more strictly, the limits may be set as pre-defined rules or tables in specifications or regulatory requirements for operation, by a radio node, in a certain region. Such limits may be part of, for example, the European Telecommunications Standards Institute (ETSI) harmonized standard in Europe as well as the 3rd Generation Partnership Project (3GPP) specification for operation of Long-Term Evolution (LTE) or New Radio (NR, also referred to as 5th Generation (5G)) in unlicensed spectrum.

Some example details of various embodiments of the present disclosure are described in the embodiments below. Although the examples may be described in terms of a WD 22 as the radio node transmitting in the unlicensed spectrum, it should be understood that the principles and embodiments may be applicable to other types of radio nodes operating in the unlicensed spectrum, such as, a network node 16.

Embodiment 1

In some embodiments, the transmission time limits are varied as a function of the energy detection threshold used in the LBT procedure to gain access to the channel for such transmission (e.g., such may be predefined at WD 22 and/or WD 22 is configured by radio interface 62 of network node 16, such as via radio resource control signaling). An example of such variable limits is captured in the table below, Table 1. It will be apparent to those skilled in the art that the limits could be lower or higher than the lowest and highest value shown in the table and also that the number of limits set could be different in other embodiments.

TABLE 1

| Maximum ED threshold used during the successful LBT procedure securing channel access for the current transmission | Maximum channel occupancy time |
|---|---|
| −62 dBm | 4 ms |
| −67 dBm | 5 ms |
| −72 dBm | 6 ms |
| −77 dBm | 7 ms |
| −82 dBm | 8 ms |

In some embodiments, the WD 22 may transmit for a lower duration than the above limits associated to the corresponding ED threshold, but may not exceed these limits. In another variation of this embodiment, the limits may be characterized as a function of the energy detection threshold. An example is as shown below:

$$MCOT(X)=4-((X+62)/5).$$

Embodiment 2

The contention window size for the LBT protocol used to access the channel has a minimum and maximum limit. When, a transmission is detected to be successful, the contention window (CW) size is reset to the minimum size. When a transmission is detected to be unsuccessful (e.g., due to a collision with another device transmitting simultaneously), the contention window size typically increases (typically doubles) every time a collision is detected on the channel unless it is already at the maximum limit. The contention window sizes typically used for a supervising device such as a network node 16, (e.g., base station) are {7, 15, 31, 63}. The contention window sizes typically used for a supervised device such as WD 22 are {15, 31, 63, 127, 255, 512, 1023}.

In some embodiments, the set of contention window sizes and/or prioritization periods are dependent on the energy detection threshold used (e.g., such may be predefined at WD 22 and/or WD 22 is configured by radio interface 62 of network node 16, such as via radio resource control signaling). An example is provided below in Table 2.

TABLE 2

| Maximum ED threshold used during the successful LBT procedure securing channel access for the current transmission | Set of contention window (CW) sizes for priority classes 1, 2, 3 and 4 Note: Priority classes 3 and 4 have different defer periods also known as prioritization periods for which the device has to wait prior to counting down slots | Prioritization (also known as defer) periods for priority classes 1, 2, 3 and 4 (in slots) |
|---|---|---|
| −62 dBm | {15, 31} | 2 |
| | {31, 63} | 2 |
| | {63, 127, 255, 511, 1023} | 3 |
| | {63, 127, 255, 511, 1023} | 7 |

TABLE 2-continued

| Maximum ED threshold used during the successful LBT procedure securing channel access for the current transmission | Set of contention window (CW) sizes for priority classes 1, 2, 3 and 4 Note: Priority classes 3 and 4 have different defer periods also known as prioritization periods for which the device has to wait prior to counting down slots | Prioritization (also known as defer) periods for priority classes 1, 2, 3 and 4 (in slots) |
|---|---|---|
| −67 dBm | {7, 15} | 2 |
| | {15, 31} | 2 |
| | {31, 63, 127, 255, 511} | 3 |
| | {31, 63, 127, 255, 511} | 7 |
| −72 dBm | {3, 7} | 1 |
| | {7, 15} | 1 |
| | {15, 31, 63, 127, 255} | 3 |
| | {15, 31, 63, 127, 255} | 7 |
| −77 dBm | {3, 7} | 1 |
| | {7, 15} | 1 |
| | {15, 31, 63, 127} | 3 |
| | {15, 31, 63, 127} | 7 |
| −82 dBm | {3, 7} | 1 |
| | {7, 15} | 1 |
| | {15, 31, 63} | 3 |
| | {15, 31, 63} | 7 |

In some embodiments, when the ED threshold is increased, the maximum contention window size and/or the minimum contention window size for a particular priority class May increase. In this example, the maximum contention window size increases from an ED threshold of −82 dBm to −72 dBm after which both the maximum and minimum size increase. This embodiment allows any combination of these increases. In some embodiments, when the ED threshold is decreased, the maximum contention window size and/or the minimum contention window size for a particular priority class may also decrease.

In the example in the table above, the contention window size in each set is always doubled. As per this embodiment, no such restrictions are necessary and the contention window sizes can have any values. For instance, the next contention window size in a set could be quadrupled.

In a variation of this embodiment, there may be an additional requirement (e.g., predefined at WD 22 and/or WD 22 is configured by radio interface 62 of network node 16, such as via radio resource control signaling) that WDs 22 need to be able to operate with a packet error rate less than a certain threshold, e.g., 10%, measured over a certain period of time, e.g., 5 millisecond (ms).

Fully Flexible Selection of the Energy Detection Threshold for a Transmission

In this embodiment, the WD 22 may be free to select any maximum energy detection threshold for a particular transmission. When a transmission is unsuccessful, the WD 22 increments its contention window size to the lowest value above the value used for the unsuccessful transmission in the set corresponding to the energy detection threshold that the WD 22 intends to use for the next transmission. If the highest value in the set is lower than the currently used value, then this highest value is used. Similarly, when a transmission is successful, the WD 22 resets the contention window to the lowest value in the set corresponding to the energy detection threshold that the WD 22 intends to use for the next transmission.

Some illustrative examples are shown in the table below, Table 3, using the sets shown in the example table above for priority class 4.

TABLE 3

| Maximum ED threshold used during the successful LBT procedure securing channel access for the current transmission | CW used for current transmission | Transmission successful? | ED to be used for next transmission | CW to be used for next transmission |
|---|---|---|---|---|
| −72 | 31 | No | −62 | 63 |
| −72 | 127 | No | −82 | 63 |
| −82 | 31 | Yes | −62 | 63 |
| −62 | 255 | Yes | −82 | 15 |

Partially flexible selection of the maximum energy detection threshold for a transmission In this embodiment, restrictions may be placed on the WD 22 selection of the energy detection threshold. In one variation of this embodiment, the WD 22 may be restricted from choosing a different energy detection threshold unless the maximum contention window size corresponding to the current energy detection threshold has been used.

In another embodiment, the WD 22 may be restricted from choosing a different energy detection threshold until a certain duration of time has passed since the current energy detection threshold was chosen. For instance, the energy detection threshold may be restricted to be changed only once per second.

Embodiment 3

In some embodiments, the set of contention window sizes, prioritization periods and transmission time limits may all be dependent on the energy detection threshold to be used for a transmission. An example is shown in the table below, Table 4.

TABLE 4

| Maximum ED threshold used during the successful LBT procedure securing channel access for the current transmission | Set of contention window (CW) sizes | Maximum channel occupancy time for priority classes 1, 2, 3 and 4 | Prioritization (also known as defer) periods for priority classes 1, 2, 3 and 4 (in slots) |
|---|---|---|---|
| −62 dBm | {15, 31} | 2 ms, | 2 |
|  | {31, 63} | 4 ms, | 2 |
|  | {63, 127, 255, 511, 1023} | 6 ms, | 3 |
|  | {63, 127, 255, 511, 1023} | 6 ms | 7 |
| −67 dBm | {7, 15} | 2.5 ms, | 2 |
|  | {15, 31} | 4.5 ms, | 2 |
|  | {31, 63, 127, 255, 511} | 6.5 ms, | 3 |
|  | {31, 63, 127, 255, 511} | 6.5 ms | 7 |
| −72 dBm | {3, 7} | 3 ms, | 1 |
|  | {7, 15} | 5 ms, | 1 |
|  | {15, 31, 63, 127, 255} | 7 ms, | 3 |
|  | {15, 31, 63, 127, 255} | 7 ms | 7 |
| −77 dBm | {3, 7} | 3.5 ms, | 1 |
|  | {7, 15} | 5.5 ms, | 1 |
|  | {15, 31, 63, 127} | 7.5 ms, | 3 |
|  | {15, 31, 63, 127} | 7.5 ms | 7 |
| −82 dBm | {3, 7} | 4 ms, | 1 |
|  | {7, 15} | 6 ms, | 1 |
|  | {15, 31, 63} | 8 ms, | 3 |
|  | {15, 31, 63} | 8 ms | 7 |

As part of this embodiment, the prioritization periods (also known as defer periods) which determines the amount of time a device waits before counting down idle slots, may also be changed (e.g., by WD 22 and/or network node 16) as a function of the energy detection threshold. In general, as the energy detection threshold is increased one or more of the following changes may occur:
1) A decrease in the MCOT;
2) An increase in the minimum contention window size;
3) An increase in the maximum contention window size; and/or
4) An increase in the prioritization period.

In the example above, the MCOT and maximum contention window sizes are always increased (e.g., when the energy detection threshold is increased). The minimum contention window size increases when the energy detection threshold increases beyond −72 dBm and the prioritization periods are unchanged. The embodiment allows any combination of the above to be applied as a function of the energy detection threshold beyond those shown in the example.

Embodiment 4

In some embodiments, duty cycle of transmissions within a fixed time period is limited depending on the energy detection thresholds to be used for a transmission (e.g., may be predefined at WD 22 and/or WD 22 is configured by radio interface 62 of network node 16, such as via radio resource control signaling). This constraint may be applied in conjunction with any of the other limits disclosed herein including transmission time limits, contention window size allowances, prioritization periods, packet error rates, restrictions on switching between threshold limits, etc. An example is shown in the table below, Table 5, where the duty cycle is based on the percentage of time the WD 22 is transmitting over a 100 ms period.

TABLE 5

| Maximum ED threshold used during the successful LBT procedure securing channel access for the current transmission | Maximum channel occupancy time | Maximum duty cycle (%/100 ms) |
|---|---|---|
| −62 dBm | 6 ms | 10 |
| −67 dBm | 6 ms | 30 |
| −72 dBm | 6 ms | 50 |
| −77 dBm | 6 ms | 70 |
| −82 dBm | 6 ms | 90 |

Embodiment 5

In some embodiments, when the limits on transmission times, LBT parameters, etc. disclosed herein are set by a network node 16, one or more of transmission time limits, packet error rate constraints and allowed LBT parameter settings, for a given ED threshold, are set based on the observed channel measurements. Such observed channel measurements (e.g., measured by WD 22) may include one or more of:
  Channel occupancy, which may be indicative of a portion of resources and/or signals/channels for which the channel is sensed to be busy e.g., measured RSSI is above a threshold. Channel occupancy may also be a channel busy ratio (or CBR), channel occupancy ratio (CR), RSSI measurement, or similar; and/or
  Average received energy levels on the carrier which may be measured along with the channel occupancy measurement described above.

The channel measurements may be reported or indicated (e.g., by radio interface 82 of WD 22) to a network node 16 to facilitate such configuring of the transmission time limits and/or allowed LBT parameter settings by the network node 16.

Embodiment 6

At a scheduling device such as a network node 16 (e.g., gNB) one or more of the following procedures may be followed considering the different transmission time limits and/or allowed LBT parameter settings.

In one procedure, scheduling, hybrid automatic repeat reQuest (HARQ) configuration, etc. are adjusted (e.g., by network node 16 and/or signaled to the WD 22) after determining (e.g., by network node 16 and/or WD 22) an ED threshold to operate at, taking into consideration the associated transmission time, LBT parameters, packet error rate, duty cycle and other such constraints associated with the ED threshold.

In an alternative procedure, based on the scheduling and the communication requirements (including, e.g., the amount of data and priority for the data to be transmitted in unlicensed spectrum), the radio node (e.g., network node 16 and/or WD 22) determines the ED threshold to be used also taking into consideration the associated transmission time, LBT parameters, packet error rate, duty cycle and other such constraints associated with the ED threshold. The ED threshold may be varied very rapidly or slowly depending on the characteristics of the traffic to be supported by the scheduler (e.g., in network node 16 and/or WD 22).

Embodiment 7

This embodiment may be considered an extension of e.g., Embodiments 1-3 above and can be used in conjunction with any of these embodiments or alone. In this embodiment, if a WD 22 is using a particular energy detection threshold T1 in attempting to gain access to the channel, and the WD 22 defers to another WD 22 during the channel access procedure being followed for the current transmission at a lower threshold T2 than the energy detection threshold being used (T2<T1) by freezing its backoff counter until the other device has stopped transmission, the WD 22 is allowed to do one or more of the following:
  a) Use the maximum channel occupancy time limit (if applicable depending on which one of Embodiments 1-3 is being used) corresponding to the lower threshold, T2, for the current transmission to be performed after the end of the channel access procedure or for the next transmission for which a new random backoff counter is drawn to perform the channel access procedure; and/or
  b) Use the contention windows size set and prioritization periods (if applicable depending on which one of embodiments 1-3 is being used) corresponding to the lower threshold, T2, on the next transmission for which a new random backoff counter is drawn to perform the channel access procedure.

The following non-limiting examples illustrate the embodiment. A Wi-Fi device (e.g., WD 22) typically uses an energy detection threshold of −62 dBm per 20 MegaHertz (MHz) and a separate preamble detection procedure which may lead to deferrals to devices from which energy is received at −82 dBm or lower. As part of the channel access procedure, such a Wi-Fi device may draw a random counter N so that after an initial prioritization (often referred to as a deferral) period, N slots need to be sensed to be idle before transmission. During each of these N slots, the WD 22 may perform the following checks:
  c) Detect any energy that is received at a level greater than −62 dBm in which case the slot is considered busy; and/or
  d) Detect any Wi-Fi preamble that is received at a level greater than −82 dBm in which case all slots for a duration signaled in the preamble are considered busy.

As per this embodiment, when a Wi-Fi device, e.g., WD 22, following the procedure above draws a random counter N and performs the channel access procedure, it will use the maximum transmission time limits, contention window sizes and prioritization periods (as applicable) corresponding to the −62 dBm ED threshold level. If during the sensing of the N slots during the channel access procedure, the WD 22 detects a Wi-Fi preamble and suspends the decrementing of the random counter until the device transmitting the preamble has stopped transmission, the WD 22 may, such as via radio interface 82 and/or processing circuitry 84, perform one or more of the following:
  e) Use a maximum transmission duration limit corresponding to the −82 dBm threshold (if applicable depending on which one of embodiments 1-3 is being used) for the upcoming transmission for which the channel access procedure is currently ongoing or for the next transmission for which a new random backoff counter will be drawn; and/or
  f) Use the contention windows size set and prioritization periods (if applicable depending on which one of embodiments 1-3 is being used) corresponding to the lower threshold, −82 dBm, on the next transmission for which a new random backoff counter is drawn to perform the channel access procedure.

Embodiment 8

As with Embodiment 7, discussed above, this embodiment may be considered an extension of Embodiments 1-3 above and can be used in conjunction with any of these embodiments, or alone. In this embodiment, if a WD 22 is using a particular energy detection threshold T1 in attempting to gain access to the channel, and the WD 22 defers to another WD 22 during the channel access procedure being followed for the current transmission at a lower threshold T2 than the energy detection threshold being used (T2<T1) by freezing its backoff counter until the other device has stopped transmission, the device is permitted to do the following:
  1) If during the channel access procedure for the current transmission:
    a. The WD 22 detects energy at level greater than T1, the WD 22 may use the maximum channel occupancy time limit, contention windows size set and prioritization periods (if applicable depending on which one of embodiments 1-3 is being used) corresponding to the higher threshold T1 for the next transmission for which a channel access procedure is to be performed for which a new random backoff counter is drawn; and/or
    b. The WD 22 does not detect any energy at level greater than T1, the WD 22 may use the maximum channel occupancy time limit, contention windows size set and prioritization periods (if applicable depending on which one of Embodiments 1-3 is being used) corresponding to the lower threshold T2 for the next for the next transmission for which a channel access procedure is to be performed for which a new random backoff counter is drawn.

Embodiment 9

The contention window size for the LBT protocol used to access the channel has a minimum and maximum limit. When a transmission is detected as being successful, the contention window (CW) size is reset to the minimum size. When a transmission is detected as being unsuccessful (e.g., due to a collision with another WD 22 transmitting simultaneously), the contention window size typically increases (typically doubles) every time a collision is detected on the channel unless the contention window size is already at the maximum limit.

In this embodiment, the contention window size to be used for selection of the random back-off may be scaled by e.g., a factor k, where k depends on one or more of an intended transmit duration and a maximum transmission limit (e.g., MCOT). As a non-limiting example, k=intended transmission duration/maximum transmission limit and the random backoff is a random counter-drawn between 0 and CW_high, where:

$$CW\_high=\max\{CW\_min, CW*k\}.$$

Some embodiments may include one or more of:

Embodiment A1. A network node configured to communicate with a wireless device (WD), the network node configured to, and/or comprising a radio interface and/or comprising processing circuitry configured to one or more of:
 optionally, configure the WD with a plurality of listen-before-talk parameters, the configuration indicating, for each of a plurality of energy detection (ED) threshold values, a corresponding set of listen-before-talk parameters to be used for the transmission; and/or
 receive a transmission in an unlicensed spectrum according to at least one out of a plurality of listen-before-talk parameters, the at least one out of the plurality of listen-before-talk parameters being based on an ED threshold value used to access a channel in the unlicensed spectrum.

Embodiment A2. The network node of Embodiment A1, wherein the plurality of listen-before-talk parameters includes at least one of a maximum channel occupancy time and/or transmission time limits and/or contention window sizes and/or defer periods and/or packet error rates and/or duty cycles.

Embodiment A3. The network node of any one of Embodiments A1 and A2, wherein the network node and/or the radio interface and/or the processing circuitry is configured to:
 schedule the WD and/or configure hybrid automatic repeat request (HARQ) feedback based on at least one of the ED threshold value and/or the at least one out of the plurality of listen-before-talk parameters used for the transmission.

Embodiment B1. A method implemented in a network node, the method comprising one or more of:
 optionally, configuring a wireless device (WD) with a plurality of listen-before-talk parameters, the configuration indicating, for each of a plurality of energy detection (ED) threshold values, a corresponding set of listen-before-talk parameters to be used for the transmission; and/or
 receiving a transmission in an unlicensed spectrum according to at least one out of a plurality of listen-before-talk parameters, the at least one out of the plurality of listen-before-talk parameters being based on an (ED) threshold value used to access a channel in the unlicensed spectrum.

Embodiment B2. The method of Embodiment B1, wherein the plurality of listen-before-talk parameters includes at least one of a maximum channel occupancy time and/or transmission time limits and/or contention window sizes and/or defer periods and/or packet error rates and/or duty cycles.

Embodiment B3. The method of any one of Embodiments B1 and B2, further comprising:
 scheduling the WD and/or configure hybrid automatic repeat request (HARQ) feedback based on at least one of the ED threshold value and/or the at least one out of the plurality of listen-before-talk parameters used for the transmission.

Embodiment C1. A wireless device (WD) configured to communicate with a network node, the WD configured to, and/or comprising a radio interface and/or processing circuitry configured to one or more of:
 select at least one out of a plurality of listen-before-talk parameters based at least in part on an energy detection (ED) threshold value used to access a channel in an unlicensed spectrum; and
 perform a transmission in the unlicensed spectrum according to the selected at least one out of the plurality of listen-before-talk parameters.

Embodiment C2. The WD of Embodiment C1, wherein the plurality of listen-before-talk parameters at least one of a maximum channel occupancy time and/or transmission time limits and/or contention window sizes and/or defer periods and/or packet error rates and/or duty cycles.

Embodiment C3. The WD of any one of Embodiment C1 and C2, wherein the WD and/or the radio interface and/or the processing circuitry is configured to:
 obtain a configuration of the plurality of listen-before-talk parameters, the configuration indicating, for each of a plurality of ED threshold values, a corresponding set of listen-before-talk parameters to be used for the transmission.

Embodiment D1. A method implemented in a wireless device (WD), the method comprising one or more of:
 selecting at least one out of a plurality of listen-before-talk parameters based at least in part on an energy detection (ED) threshold value used to access a channel in an unlicensed spectrum; and
 performing a transmission in the unlicensed spectrum according to the selected at least one out of the plurality of listen-before-talk parameters.

Embodiment D2. The method of Embodiment D1, wherein the plurality of listen-before-talk parameters at least one of a maximum channel occupancy time and/or transmission time limits and/or contention window sizes and/or defer periods and/or packet error rates and/or duty cycles.

Embodiment D3. The method of any one of Embodiment D1 and D2, further comprising:
 obtaining a configuration of the plurality of listen-before-talk parameters, the configuration indicating, for each of a plurality of ED threshold values, a corresponding set of listen-before-talk parameters to be used for the transmission.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented in a radio node, the method comprising:
   determining: (i) a maximum channel occupancy time (MCOT) value; and (ii) at least one listen-before-talk (LBT) parameter setting for one or more LBT parameters, wherein at least one of the MCOT value and the at least one LBT parameter setting is determined based on an energy detection (ED) threshold value used to access a channel in an unlicensed spectrum; and
   performing a LBT procedure to gain access to the channel and a transmission on the channel according to the at least one LBT parameter setting and the MCOT value.

2. The method of claim 1, wherein the MCOT value depends on the ED threshold value used to access the channel.

3. The method of claim 2, wherein the MCOT value decreases as the ED threshold value increases.

4. The method of claim 1, wherein:
   the at least one LBT parameter setting comprises a set of contention window sizes; and
   the set of contention window sizes depends on the ED threshold value used to access the channel.

5. The method of claim 4, further comprising:
   selecting a contention window size from the set of contention window sizes for the LBT procedure based at least in part on whether a previous transmission on the channel is successful.

6. The method of claim 5, wherein the selecting further comprises selecting the ED threshold value according to a restriction associated with the ED threshold value.

7. The method of claim 1, wherein:
   the at least one LBT parameter setting comprises a defer period value; and
   the value of the defer period depends on the ED threshold value used to access the channel.

8. The method of claim 1, wherein the at least one of the MCOT value and the at least one LBT parameter setting for the one or more LBT parameters further depends on a priority class.

9. The method of claim 1, wherein when the ED threshold value used to access the channel in the unlicensed spectrum is increased, as compared to a previous ED threshold value used to access the channel, the determining at least one of the MCOT value and the at least one LBT parameter setting comprises at least one of:
 decreasing a maximum channel occupancy time for the transmission;
 increasing a minimum contention window size for the transmission;
 increasing a maximum contention window size for the transmission; and
 increasing a defer period for the transmission.

10. The method of claim 1, wherein:
 the at least one LBT parameter setting comprises a maximum duty cycle value; and
 the maximum duty cycle value depends on the ED threshold value used to access the channel.

11. The method of claim 1, further comprising:
 obtaining a configuration indicating the at least one LBT parameter setting.

12. The method of claim 11, wherein at least one of:
 the configuration indicates, for each of a plurality of ED threshold values, a corresponding set of LBT parameter settings for the one or more LBT parameters; and
 the configuration is based at least in part on an observed channel measurement.

13. The method of claim 11, further comprising:
 obtaining a channel measurement report, the configuration being based at least in part on the channel measurement report.

14. The method of claim 1, further comprising:
 obtaining scheduling information, the scheduling information being determined based at least in part on at least one of:
  the ED threshold value; and
  the at least one of the MCOT value and the at least one LBT parameter setting for the one or more LBT parameters.

15. The method of claim 1, further comprising:
 determining the ED threshold value used to access the channel; and
 adjusting at least one of scheduling and at least one hybrid automatic repeat request, HARQ, configuration in dependence on the at least one of the MCOT value and the at least one LBT parameter setting associated with the ED threshold value.

16. The method of claim 1, further comprising:
 determining the ED threshold value in dependence on: (i) scheduling requirements at the radio node; and (ii) the MCOT value and/or the at least one LBT parameter setting associated with the ED threshold value.

17. The method of claim 1, further comprising:
 as a result of deferring to a second radio node during a channel access procedure in which energy from the second radio node is received at a lower value than the ED threshold value used by the radio node during the channel access procedure:
  using an MCOT value or at least one listen-before-talk parameter setting for at least one LBT parameter that corresponds to a lower ED threshold value for a next transmission after the channel access procedure.

18. The method of claim 17, wherein the MCOT value or the at least one listen-before-talk parameter setting for the at least one LBT parameter that corresponds to the lower ED threshold value comprises at least one of: a maximum channel occupancy time value, a transmission time limit value, a contention window size, a defer period and a maximum duty cycle.

19. The method of claim 1, further comprising:
 as a result of deferring to a second radio node during a channel access procedure:
  when detecting an energy level greater than the ED threshold during the channel access procedure, using an MCOT value or at least one listen-before-talk parameter setting for at least one LBT parameter that corresponds to the ED threshold value for a next transmission after the channel access procedure; and
  otherwise, using an MCOT value or at least one listen-before-talk parameter setting for at least one LBT parameter that corresponds to a lower ED threshold value for the next transmission after the channel access procedure.

20. A wireless device (WD) comprising processing circuitry, the processing circuitry configured to cause the wireless device to:
 adjust a contention window size to access a channel for a transmission in an unlicensed spectrum based at least in part on a maximum channel occupancy time (MCOT) value and a transmit duration for the transmission, wherein the MCOT value is determined based on an energy detection (ED) threshold value used to access the channel for the transmission in the unlicensed spectrum.

* * * * *